(12) United States Patent
Bullock

(10) Patent No.: US 11,984,049 B2
(45) Date of Patent: May 14, 2024

(54) PLANT IDENTIFICATION HOLDER

(71) Applicant: Ken Bullock, Salt Lake City, UT (US)

(72) Inventor: Ken Bullock, Salt Lake City, UT (US)

( * ) Notice: Subject to any disclaimer, the term of this patent is extended or adjusted under 35 U.S.C. 154(b) by 0 days.

(21) Appl. No.: 17/394,254

(22) Filed: Aug. 4, 2021

(65) Prior Publication Data
US 2022/0044597 A1    Feb. 10, 2022

Related U.S. Application Data

(60) Provisional application No. 63/061,052, filed on Aug. 4, 2020.

(51) Int. Cl.
*G09F 3/20* (2006.01)
*A47G 7/00* (2006.01)

(52) U.S. Cl.
CPC ............. *G09F 3/206* (2013.01); *A47G 7/00* (2013.01)

(58) Field of Classification Search
CPC .... G09F 3/206; G09F 2003/0283; G09F 3/20; G09F 3/16; G09F 7/00; G09F 7/18; G09F 7/10; A47G 7/00; A01G 9/006
USPC ... 40/645, 658, 637, 607.02, 607.05, 611.01, 40/611.06; D20/41, 43; D7/300.2
See application file for complete search history.

(56) References Cited

U.S. PATENT DOCUMENTS

| | | | | |
|---|---|---|---|---|
| 2,048,906 A * | 7/1936 | Webster | ..................... | G09F 3/20 40/645 |
| 2,052,030 A * | 8/1936 | Holzer | ..................... | G09F 3/206 40/645 |
| 3,799,488 A * | 3/1974 | Sena | ...................... | A47B 97/08 248/452 |
| 4,660,310 A * | 4/1987 | Farmer | ............... | G09F 15/0006 40/607.06 |
| 6,729,059 B1* | 5/2004 | Overdevest | ............ | A01G 9/006 40/645 |
| 7,866,075 B2 * | 1/2011 | Meeker | ..................... | G09F 7/18 40/607.01 |
| 2015/0033605 A1* | 2/2015 | Grush | ..................... | G09F 13/02 40/607.05 |

\* cited by examiner

*Primary Examiner* — Cassandra Davis
(74) *Attorney, Agent, or Firm* — Kunzler Bean & Adamson

(57) ABSTRACT

A plant identification holder that comprises a base portion that includes a sign-retention receptacle configured to selectively retain a plant identification sign. The plant identification holder also includes an anchor portion that includes at least one anchor coupled to and extending from the base portion.

12 Claims, 21 Drawing Sheets

US 11,984,049 B2

PLANT IDENTIFICATION HOLDER

CROSS-REFERENCE TO RELATED APPLICATION

This application claims the benefit of U.S. Provisional Patent Application No. 63/061,052, filed Aug. 4, 2020, which is incorporated by reference in its entirety.

FIELD

This disclosure relates generally to plant identification, and more particularly to plant identification holders and components.

BACKGROUND

Conventional plant identification stakes are designed to be inserted into the potting soil of plants for sale to help identify the plants to potential purchasers of the plants. A common practice by gardeners is to use the plant identification stake that came with a purchased plant to identify the plant after the plant is permanently planted. While this practice has some short-term benefits, over time, plant identification stakes suffer from several shortcomings. For example, plant identification stakes are made of a brittle, flexible, thin sheet of plastic, which results in the stakes being prematurely broken and degraded. Additionally, plant identification stakes are designed for temporary anchoring in the ground and, as such, fail to provide secure anchoring for prolonged use, which results in easy dislodgement and loss of the stakes.

SUMMARY

The subject matter of the present application has been developed in response to the present state of the art, and in particular, in response to the problems and needs of conventional plant identification stakes that have not yet been fully solved. In view of the foregoing, the subject matter of the present application has been developed to provide a plant identification holder and corresponding system and method that overcome many of the shortcomings of the prior art.

Disclosed herein is a plant identification holder. The plant identification holder comprises a base portion that comprises a sign-retention receptacle configured to selectively retain a plant identification sign. The plant identification holder also comprises an anchor portion that comprises at least one anchor coupled to and extending from the base portion. The preceding subject matter of this paragraph characterizes example 1 of the present disclosure.

The base portion further comprises at least one top tab and at least one bottom tab. The sign-retention receptacle is defined by and between the at least one top tab and the at least one bottom tab. The at least one top tab defines a top slot and the at least one bottom tab defines a bottom slot. The top slot and the bottom slot are configured to retain and secure corresponding portions of the plant identification sign. The preceding subject matter of this paragraph characterizes example 2 of the present disclosure, wherein example 2 also includes the subject matter according to example 1, above.

The at least one top tab extends downwardly toward the at least one bottom tab. The at least one bottom tab extends upwardly toward the at least one top tab. The preceding subject matter of this paragraph characterizes example 3 of the present disclosure, wherein example 3 also includes the subject matter according to example 2, above.

The base portion further comprises a prong. Each one of the at least one top tab and the at least one bottom tab extends outwardly away from the prong. The preceding subject matter of this paragraph characterizes example 4 of the present disclosure, wherein example 4 also includes the subject matter according to example 3, above.

The prong and the at least one anchor are elongated along a length of the plant identification holder. Each one of the at least one top tab and the at least one bottom tab extend outwardly away from the prong in a direction parallel to a width of the plant identification holder. The width of the plant identification holder is perpendicular to the length of the plant identification holder. The width of the plant identification holder is less than the length of the plant identification holder. A thickness of the plant identification holder is perpendicular to the length and the width of the plant identification holder. The thickness of the plant identification holder is less than the width of the plant identification holder. The preceding subject matter of this paragraph characterizes example 5 of the present disclosure, wherein example 5 also includes the subject matter according to example 4, above.

The width of the at least one anchor is greater than the width of the prong of the base portion. The preceding subject matter of this paragraph characterizes example 6 of the present disclosure, wherein example 6 also includes the subject matter according to example 5, above.

The top slot is defined between the at least one top tab and the prong. The bottom slot is defined between the at least one bottom tab and the prong. The preceding subject matter of this paragraph characterizes example 7 of the present disclosure, wherein example 7 also includes the subject matter according to any one of examples 4-6, above.

Each one of the top slot and the bottom slot extends in a direction parallel to the thickness of the plant identification holder. The preceding subject matter of this paragraph characterizes example 8 of the present disclosure, wherein example 8 also includes the subject matter according to any one of examples 2-7, above.

The sign-retention receptacle comprises first and second open ends, which are opposite each other, and an open front side. The preceding subject matter of this paragraph characterizes example 9 of the present disclosure, wherein example 9 also includes the subject matter according to example 8, above.

The base portion further comprises a U-shaped portion comprising two spaced-apart prongs. The anchor portion further comprises two anchors, spaced apart from and parallel to each other, and extending from corresponding ones of the spaced-apart prongs of the U-shaped portion. The base portion further comprises two top tabs and two bottom tabs. Each one of the two top tabs and each one of the two bottom tabs extends outwardly away from a corresponding one of the spaced-apart prongs. The sign-retention receptacle is defined by and between the two top tabs and the two bottom tabs. The preceding subject matter of this paragraph characterizes example 10 of the present disclosure, wherein example 10 also includes the subject matter according to any one of examples 2-9, above.

The base portion and the anchor portion are co-planar. The preceding subject matter of this paragraph characterizes example 11 of the present disclosure, wherein example 11 also includes the subject matter according to any one of examples 1-10, above.

The base portion and the anchor portion form a one-piece monolithic and seamless construction. The preceding subject matter of this paragraph characterizes example 12 of the present disclosure, wherein example 12 also includes the subject matter according to any one of examples 1-11, above.

The base portion and the anchor portion are made of a metallic material. The preceding subject matter of this paragraph characterizes example 13 of the present disclosure, wherein example 13 also includes the subject matter according to example 12, above.

The anchor comprises a pointed end portion. The preceding subject matter of this paragraph characterizes example 14 of the present disclosure, wherein example 14 also includes the subject matter according to any one of examples 1-13, above.

The sign-retention receptacle is configured to slidably receive and retain the plant identification sign. The preceding subject matter of this paragraph characterizes example 15 of the present disclosure, wherein example 15 also includes the subject matter according to any one of examples 1-14, above.

The base portion comprises a back plate that at least partially defines a closed back side of the sign-retention receptacle. The anchor portion comprises at least two anchors, spaced apart from each other, and coupled to and extending from the back plate. The back plate further comprises a top side and a bottom side, where the bottom side is interposed between the top side and the anchor portion. The base portion further comprises a top tab coupled to and extending across the top side of the back plate, a bottom tab coupled to and extending across the bottom side of the back plate, a top slot defined between the top tab and the back plate, and a bottom slot defined between the bottom tab and the back plate. The top slot and the bottom slot comprise a portion of the sign-retention receptacle. The preceding subject matter of this paragraph characterizes example 16 of the present disclosure, wherein example 16 also includes the subject matter according to any one of examples 1-3 and 8-15, above.

The base portion comprises a back plate that at least partially defines a closed back side of the sign-retention receptacle. The anchor portion comprises at least two anchors, spaced apart from each other, and coupled to and extending from the back plate. The sign-retention receptacle comprises a non-tapered portion and tapered portion, where the tapered portion is between the non-tapered portion and the anchor portion and where the tapered portion is configured to receive and retain a tapered portion of a plant identification stake comprising the plant identification sign. The base portion further comprises a first side slot and a second side slot, the first side slot defines and encloses at least part of a left side portion of the sign-retention receptacle, and the second side slot defines and encloses at least part of a right side portion of the sign-retention receptacle. The base portion also comprises a first bottom slot and second bottom slot, the first bottom slot and second bottom slot are angled relative to each other, and define and enclose at least part a left side and a right side, respectively of the tapered portion of the sign-retention receptacle. The preceding subject matter of this paragraph characterizes example 17 of the present disclosure, wherein example 17 also includes the subject matter according to any one of examples 1-3 and 8-15, above.

Further disclosed herein is a method for identifying at least one plant. The method comprises steps of matching a plant identification sign with a corresponding plant, inserting the plant identification sign into a sign-retention receptacle of a base portion of a plant identification holder, and inserting at least one anchor of the plant identification holder into soil proximate the corresponding plant. The at least one anchor is coupled to and extends from the base portion of the plant identification holder. The preceding subject matter of this paragraph characterizes example 18 of the present disclosure.

The step of inserting the plant identification sign into the sign-retention receptacle of the plant identification holder comprises sliding the plant identification sign into the sign-retention receptacle. The preceding subject matter of this paragraph characterizes example 19 of the present disclosure, wherein example 19 also includes the subject matter according to example 18, above.

Additionally disclosed herein is a system for identifying at least one plant. The system comprises at least one plant identification holder comprising a base portion, comprising a sign-retention receptacle configured to receive and secure a plant identification sign such that the plant identification sign is selectively removable from the sign-retention receptacle, and an anchor portion, comprising at least one anchor coupled to and extending from the base portion. The at least one anchor is configured to penetrate and anchor the base portion to ground. The system also comprises a plant identification sign, secured within the sign-retention receptacle and identifying a type of the at least one plant. The preceding subject matter of this paragraph characterizes example 20 of the present disclosure.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended numbered paragraphs, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
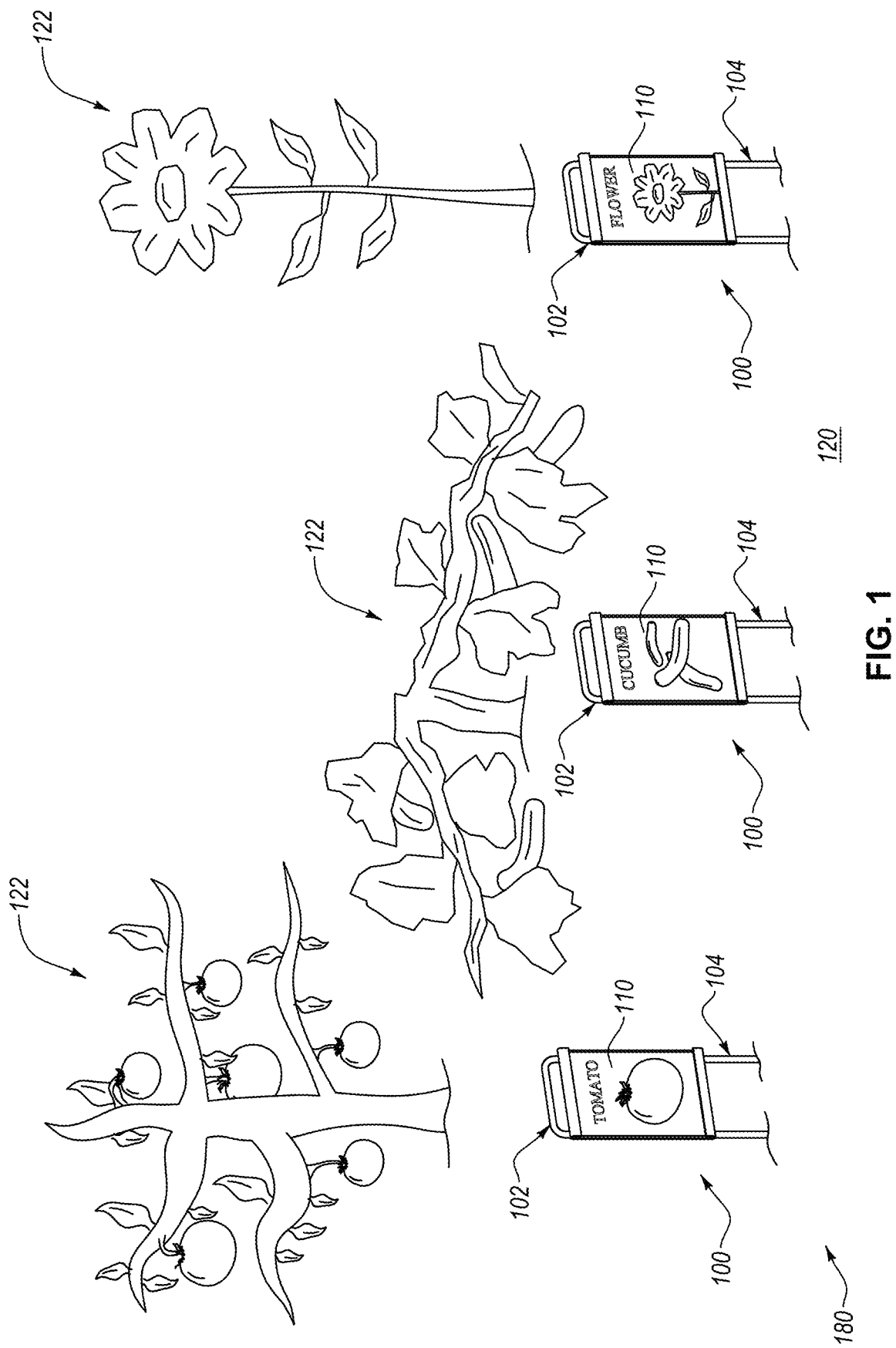
FIG. 1 is a schematic, perspective view of a system for identifying plants, according to one or more examples of the subject disclosure.

Referring to FIG. 1, according to some examples, a plant identification system 180 includes at least one plant identification holder 100 configured to facilitate the identification of at least one corresponding plant. In the illustrated example, the plant identification system 180 includes a plurality of plant identification holders 100 each corresponding with a respective one of a plurality of plants 122. Each one of the plant identification holders 100 includes a base portion 102 and an anchor portion 104. Generally, the base portion 102 is configured to receive and secure a plant identification sign 110 and the anchor portion 104 is configured to penetrate the ground 120, thus anchoring the base portion 102 to the ground 120. As shown, each plant identification holder 100 is anchored into the ground proximate a plant 122 corresponding with the plant identification sign 110 such that the plant identification holder 100 helps to identify the corresponding plant 122.

According to certain examples, as shown, the plant identification system 180 includes multiple plant identification holders 100 each identifying a different one of multiple plants 122. The plants 122 can be the same type of plant and the multiple plant identification holders 100 can identify the same type of plant. However, in some examples, the plants 122 are different types of plants and the multiple plant identification holders 100 identify different types of plants. For example, as shown, a first one of the plant identification holders 100 identifies a first type of plant 122 (e.g., a tomato plant) and is anchored proximate the first type of plant 122, a second one of the plant identification holders 100 identifies a second type of plant 122 (e.g., a cucumber plant) and is anchored proximate the second type of plant 122, and a third one of the plant identification holders 100 identifies a third type of plant 122 (e.g., a flower) and is anchored proximate the third type of plant 122. As used herein, one type of plant can be considered different than another type of plant if the plants are in different classifications, different families, different groups, different species, different varieties, or the like. For example, a cherry tomato plant and an heirloom tomato plant are considered different types of plants in the same manner that an apple tree and a rose bush are considered different types of plants.

Figure 2:
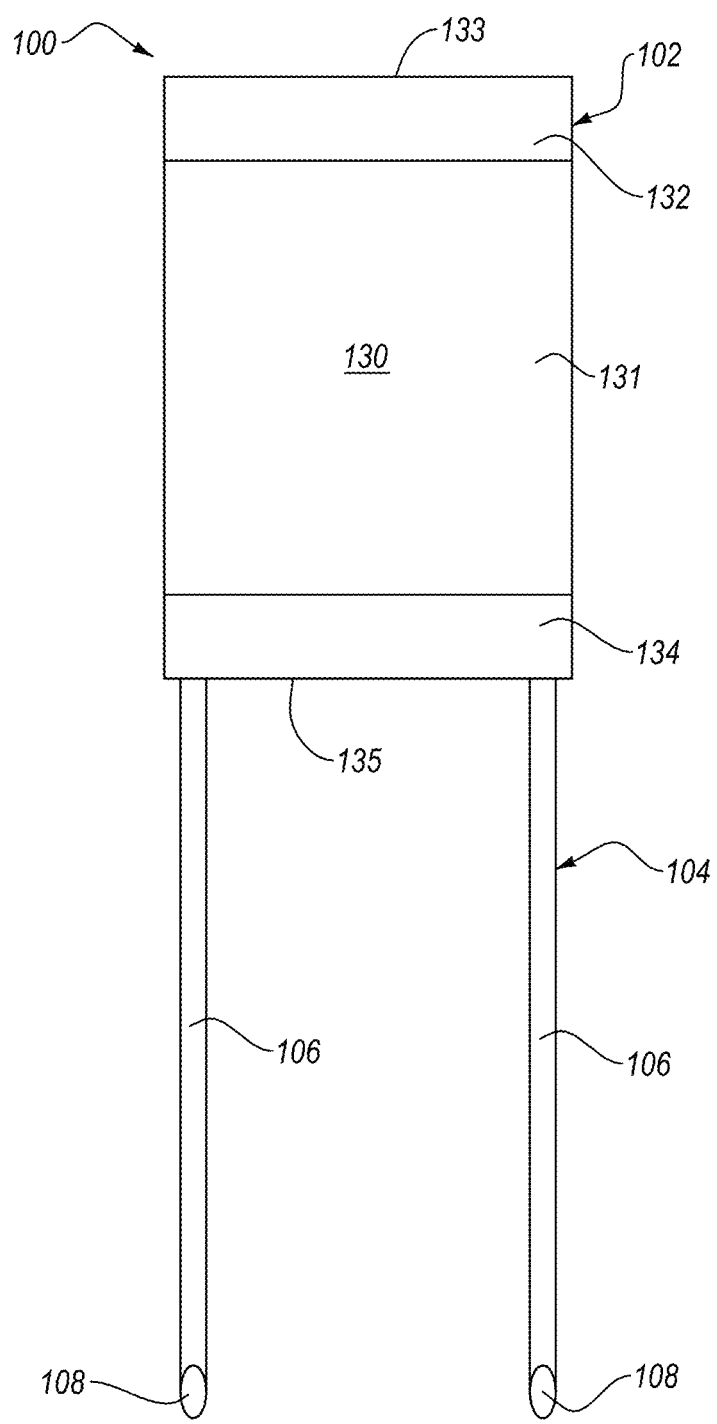
FIG. 2 is schematic, front view of a plant identification holder, according to one or more examples of the subject disclosure.
Figure 3:
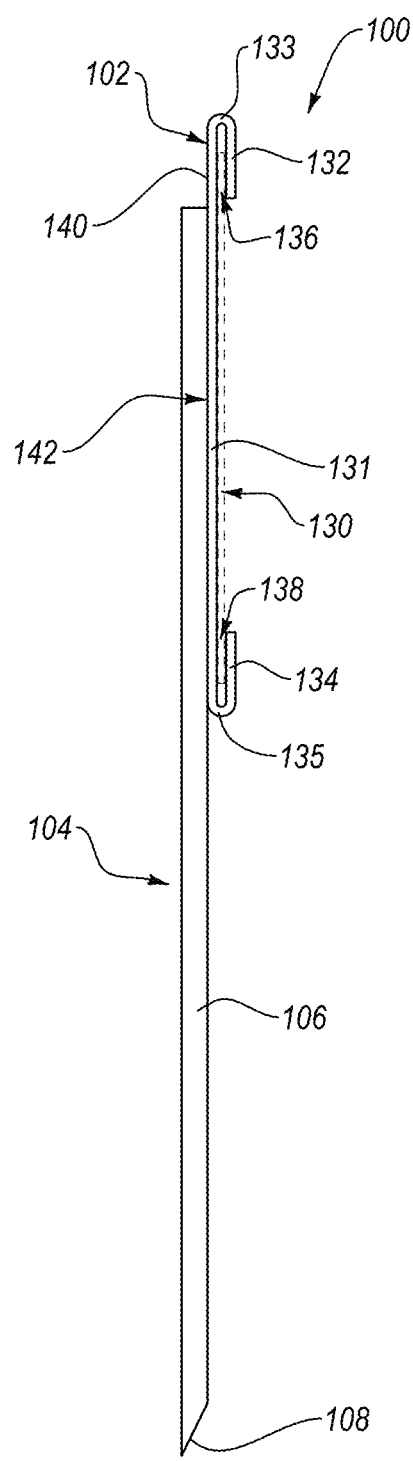
FIG. 3 is a schematic, side view of a plant identification holder, according to one or more examples of the subject disclosure.
Figure 4:
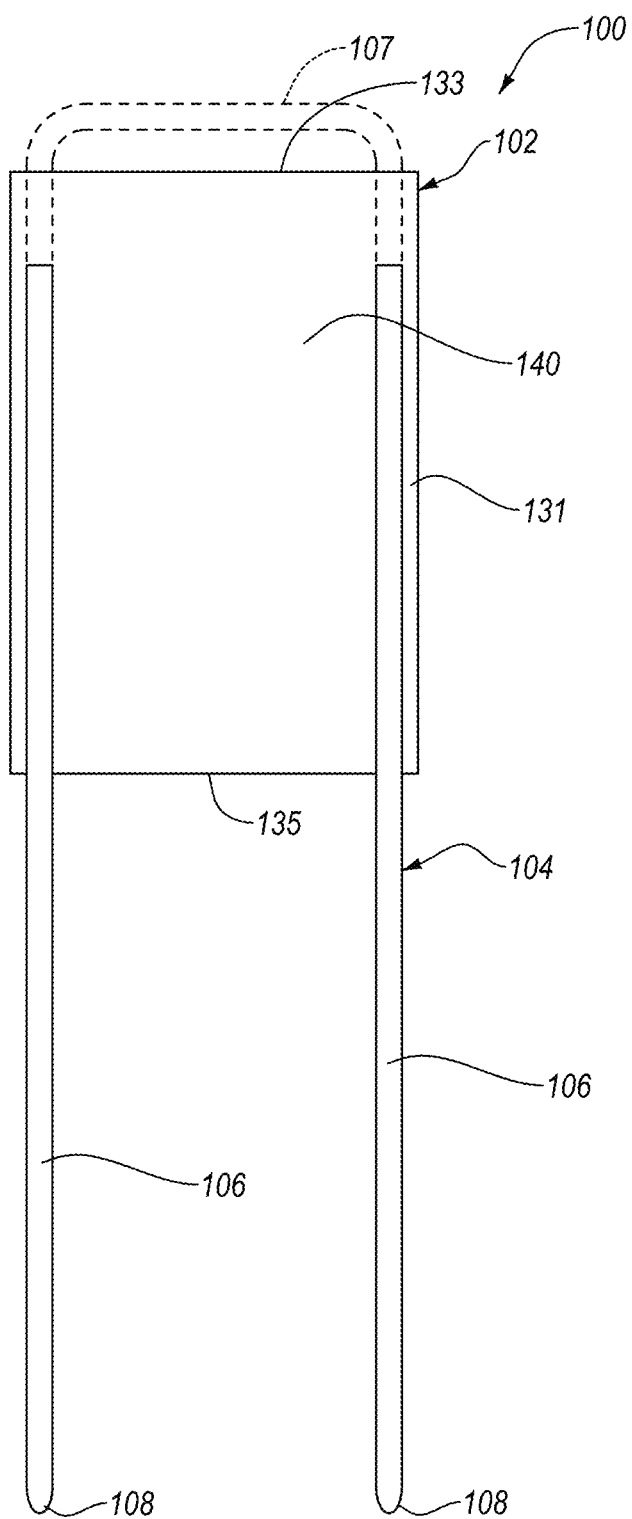
FIG. 4 is a schematic, back view of a plant identification holder, according to one or more examples of the subject disclosure.

Referring to FIGS. 2-4, according to some examples, the base portion 102 of the plant identification holder 100 includes a back plate 131 that partially defines a sign-retention receptacle 130 of the base portion 102. The base portion 102 further includes a top tab 132 and a bottom tab 134 on vertically-opposite sides (e.g., a top side 133 and a bottom side 135, respectively) of the back plate 131. Referring to FIG. 3, the top tab 132 extends, from the top side 133 of the back plate 131, downwardly toward the bottom side 135 in a spaced-apart manner relative to the back plate 131. Accordingly, a top slot 136 or top gap is defined between the top tab 132 and the back plate 131. The top slot 136 extends horizontally across the top side 133 of the back plate 131. Similarly, the bottom tab 134 extends, from the bottom side 135 of the back plate 131, upwardly toward the top side 133 in a spaced-apart manner relative to the back plate 131. Accordingly, a bottom slot 138 or bottom gap is defined between the bottom tab 134 and the back plate 131. The bottom slot 138 extends horizontally across the bottom side 135 of the back plate 131. The top slot 136 defines and encloses a top portion of the sign-retention receptacle 130 and the bottom slot 138 defines and encloses a bottom portion of the sign-retention receptacle 130. In contrast to the top and bottom portions of the sign-retention receptacle 130, left and right portions of the sign-retention receptacle 130, along with a central portion of the sign-retention receptacle 130 are open.

The base portion 102 is made from a material that is more rigid than the material of the plant identification sign 110. In one example, the base portion 102 is made of a metallic material, such as steel, or a hardened plastic.

The anchor portion 104 includes at least one anchor 106 coupled to and extending downwardly from the back plate 131. In some examples the anchor 106 extends downwardly from the back plate 131 a distance equal to or greater than a length of the back plate 131. The anchor 106 is coupled to a back side of the back plate 131, which is opposite a front side of the back plate 131. The front side of the back plate 131 defines the sign-retention receptacle 130. To help facilitate penetration of the anchor 106 into the ground 120, the anchor 106 has a pointed end portion 108 in some examples. The anchor 106 is an elongated rod in the illustrated examples. In other examples, the anchor 106 is any of various other elongated structures that promote penetration into and anchoring to the ground 120. The anchor 106 is made from a material that is more rigid than the material of the plant identification sign 110. In one example, the anchor 106 is made of a metallic material, such as steel, or a hardened plastic. According to the illustrated example, the anchor 106 is formed separately from the base portion 102 and attached or affixed to the base portion 102 using any of various attachment techniques, such as welding, adhering, gluing, brazing, etc. In one example, as shown, the anchor 106 is welded to the base portion 102 via a weldment 142. In alternative examples, the anchor 106 is co-formed with the base portion 102 such that the anchor 106 and the base portion 102 form a one-piece monolithic construction. The construction is also a seamless construction wherein the plant identification holder does not have seams such that there is no abutment of edges.

The anchor portion 104 may have a single anchor 106. However, as shown, to promote stability and reliable anchoring to the ground 120, the anchor portion 104 includes two or more anchors 106 in certain examples. In the illustrated example, the anchor portion 104 includes two anchors 106 spaced apart from each other across the back plate 131. Referring to FIG. 4, each one of the two anchors 106 is separate from, or discontinuous relative to, the other of the two anchors 106. However, for ease in manufacturing, in certain examples, the two anchors 106 are formed from a continuous length of material, such that the two anchors 106 are joined together by a transition portion 107 of the continuous length of material. According to some examples, the transition portion 107 extends upwardly beyond the upward extent of the top side 133 of the back plate 131. In such examples, the transition portion 107, extending upwardly beyond the upward extent of the top side 133 of the back plate 131, helps provide a primary or alternative handle for grasping and anchoring the plant identification holder 100 in the ground 120.

Figure 5:
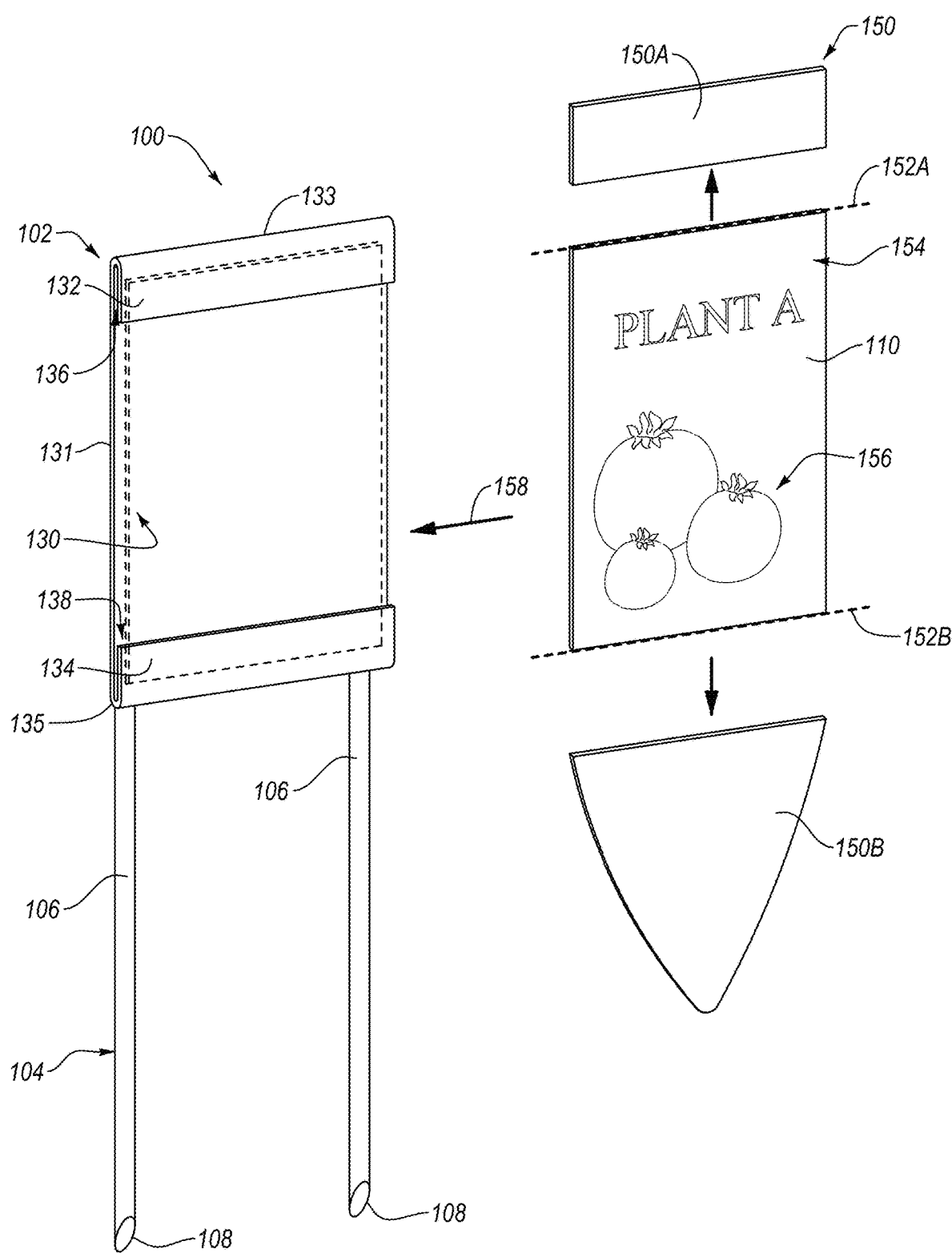
FIG. 5 is a schematic, perspective flow diagram representing a method of inserting a plant identification sign into a plant identification holder, according to one or more examples of the subject disclosure.
Figure 6:
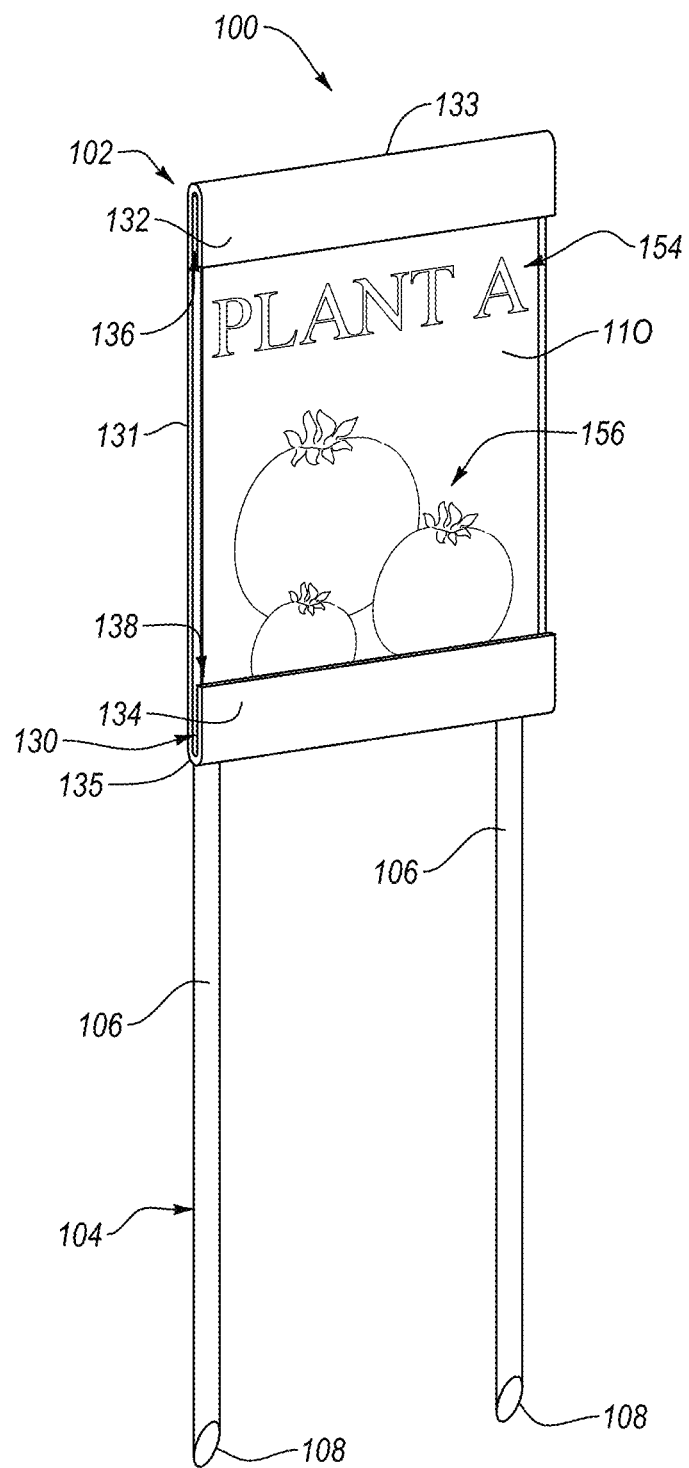
FIG. 6 is a schematic, perspective view of a plant identification sign inside a plant identification holder, according one or more to examples of the subject disclosure.

Referring to FIGS. 5 and 6, the sign-retention receptacle 130 is configured to slidably receive and retain the plant identification sign 110. The plant identification sign 110 is sized to slide into both the top slot 136 and the bottom slot 138, in a first direction 158 through an open side of the sign-retention receptacle 130, as shown in FIG. 6. The first direction 158 is parallel to the top side 133 and the bottom side 135, in some examples, which is parallel to horizontal in certain examples. Accordingly, the top slot 136 and the bottom slot 138 retain a corresponding top portion and a bottom portion of the plant identification sign 110. Retention of the top portion and the bottom portion of the plant identification sign 110 in the top slot 136 and the bottom slot 138, respectively, helps retain the entire plant identification sign 110 in the sign-retention receptacle 130.

In some examples, the plant identification sign 110 forms a portion of a plant identification stake 150, such as the portion that includes a plant name 154 and a plant picture 156. The plant identification stake 150 additionally includes a top portion 150A and a tapered portion 150B in certain examples. Initially, the plant identification sign 110, the top portion 150A, and the tapered portion 150B, which is shown separated into portions in FIG. 5, form a monolithic construction or one-piece. For example, in commercial settings (e.g., plant nurseries or similar retail establishments), the plant identification stake 150 can be used to identify plants for sale. The tapered portion 150B is inserted into the potting soil of the display pot, carton, tray, etc. into which a plant is temporarily planted prior to being sold. In other examples, the plant identification stake 150 can be sold or obtained individually independent of the sale of the plant.

Depending on the size of the plant identification stake 150, to fit in the sign-retention receptacle 130, portions of the plant identification stake 150 may need to be trimmed away prior to slidably inserting the plant identification sign 110 into the sign-retention receptacle 130. Referring to FIG. 5, in some examples, the tapered portion 150B is removed from the plant identification stake 150 by trimming the plant identification stake 150 along a bottom trim line 152B that separates the tapered portion 150B from the plant identification sign 110. Similarly, in certain examples, the top portion 150A is removed from the plant identification stake 150 by trimming the plant identification stake 150 along a top trim line 152A that separates the top portion 150A from the plant identification sign 110. After removal of the top portion 150A and the tapered portion 150B, the plant identification sign 110 of the plant identification stake 150, which includes the plant name 154 and the plant picture 156 or some other plant identification, remains and is ready for slidable insertion into the sign-retention receptacle 130. In alternative examples, the plant identification stake 150 is sized such that the top portion 150A does not need to be removed from the plant identification stake 150 for the plant identification sign 110 to be slidably inserted into the sign-retention receptacle 130. Moreover, in yet other examples, the plant identification stake 150 may not have a tapered portion 150B, such that a tapered portion need not be removed prior to slidably inserting the plant identification sign 110 into the sign-retention receptacle 130.

Figure 7:
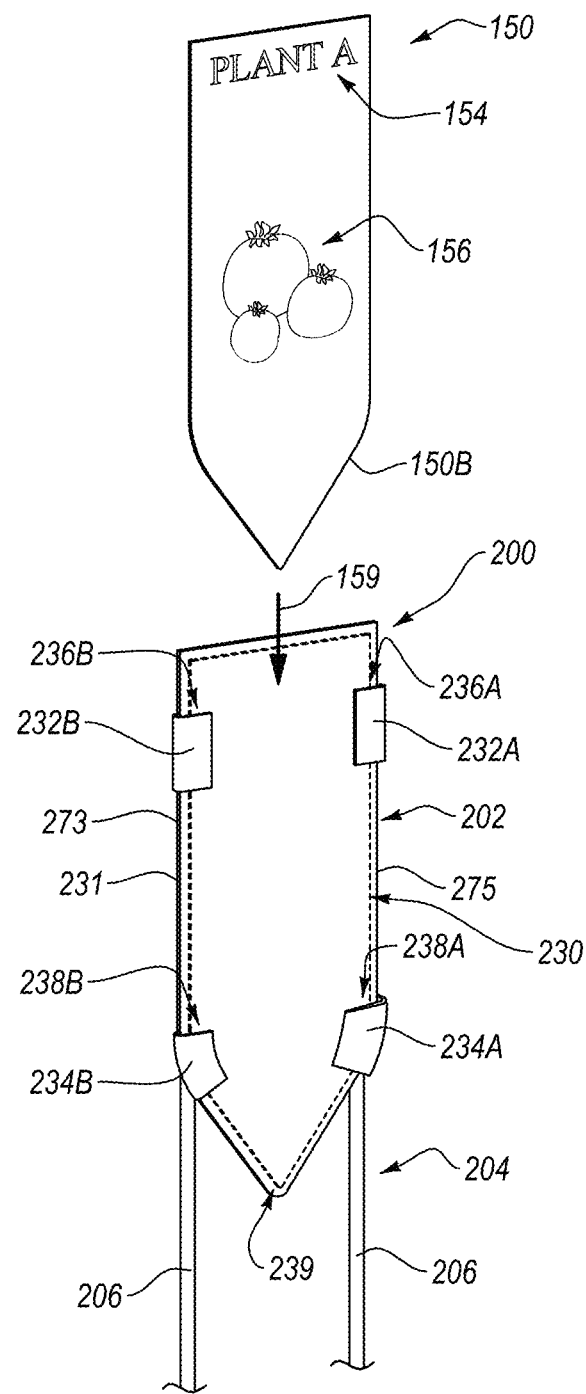
FIG. 7 is a schematic, perspective flow diagram representing a method of inserting a plant identification sign into a plant identification holder, according to one or more examples of the subject disclosure.
Figure 8:
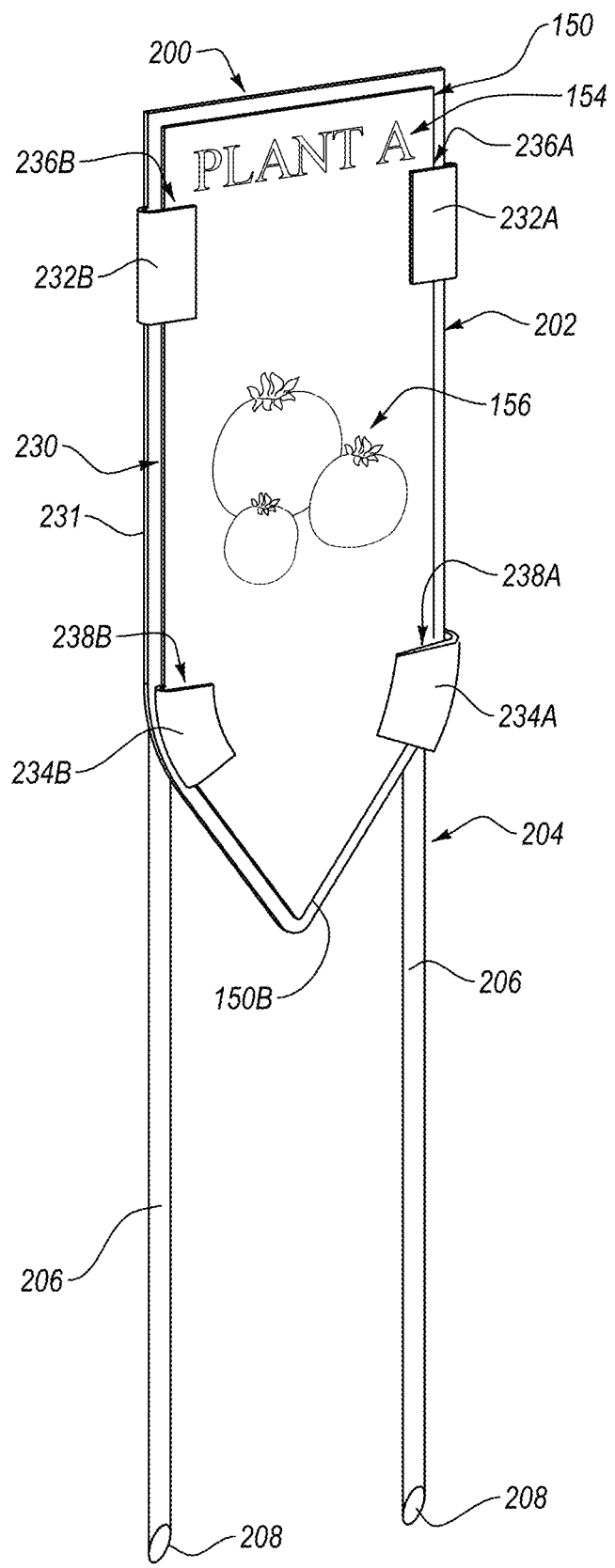
FIG. 8 is a schematic, perspective view of a plant identification sign inside a plant identification holder, according to one or more examples of the subject disclosure.

In other examples, the plant identification holder is configured to retain a plant identification stake, having a tapered portion, without requiring removal of the tapered portion. Referring to FIGS. 7 and 8, according to one example, a plant identification holder 200 includes base portion 202 and an anchor portion 204, having anchors 206. The base portion 202 includes a back plate 231. Moreover, the base portion 202 includes a sign-retention receptacle 230 at least partially defined by the back plate 231. The base portion 202, like the base portion 102 of the plant identification holder 100, also includes tabs that help retain the plant identification stake 150. However, instead of a top tab and a bottom tab, the base portion 202 includes a pair of side tabs (e.g., first side tab 232A and second side tab 232B) and a pair of bottom tabs (e.g., first bottom tab 234A and second bottom tab 234B).

The first side tab 232A and the second side tab 232B extend from a left side 275 and a right side 273 of the back plate 231, respectively, toward each other. Additionally, the first side tab 232A and the second side tab 232B are spaced apart from each other and the back plate 231. Accordingly, a first side slot 236A and a second side slot 236B are defined between the first side tab 232A and the back plate 231 and the second side tab 232B and the back plate 231, respectively. The first side slot 236A and the second side slot 236B extend vertically along the left side 275 and the right side 273 of the back plate 131, respectively. The first side slot 236A defines and encloses a section of a left side portion of the sign-retention receptacle 230 and the second side slot 236B defines and encloses a section of a right side portion of the sign-retention receptacle 230.

The first bottom tab 234A and the second bottom tab 234B extend from a left side 275 and a right side 273 of the back plate 231, respectively, toward each other at a bottom of the back plate 231. Additionally, the first bottom tab 234A and the second bottom tab 234B are spaced apart from each other and the back plate 231. Accordingly, a first bottom slot 238A and a second bottom slot 238B are defined between the first bottom tab 234A and the back plate 231 and the second bottom tab 234B and the back plate 231, respectively. The first bottom slot 238A and the second bottom slot 238B extend at angles relative to each other along the bottom of the back plate 231. The first bottom slot 238A defines and encloses a left side of a tapered portion 239 of the sign-retention receptacle 230 and the second bottom slot 238B defines and encloses a right side of the tapered portion 239 of the sign-retention receptacle 230. Although in the illustrated example, the base portion 202 includes two spaced apart bottom tabs that at least partially define the tapered portion 239 of the sign-retention receptacle 230, in other examples, the base portion 202 includes a single bottom tab, or more than two bottom tabs, that at least partially define the tapered portion 239 of the sign-retention receptacle 230.

Referring to FIG. 7, the tapered portion 239 of the sign-retention receptacle 230 is configured to receive and retain the tapered portion 150B of the plant identification stake 150. Because the tapered portion 239 of the sign-retention receptacle 230 is uniquely shaped to receive the tapered portion 150B of the plant identification stake 150, a plant identification stake having a traditional shape with a tapered portion, such as the plant identification stake 150, can be slidably inserted into and retained by the sign-retention receptacle 230 without modifying the original shape of the stake. For example, a plant identification stake 150, with, or without, the tapered portion 150B, can be slid along the back plate 231 in a second direction 159, which can be parallel to vertical, into the first side slot 236A and the second side slot 236B and then into the first bottom slot 238A and the second bottom slot 238B. Accordingly, the first side slot 236A and the second side slot 236B retain a corresponding portion of a left side and a right side of the plant identification stake 150 and the first bottom slot 238A and the second bottom slot 238B retain a corresponding portion of the tapered portion 150B of the plant identification sign 110. Retention of the side portions and the tapered portion 150B of the plant identification stake 150 in the slots, respectively, helps retain the entire plant identification stake 150 in the sign-retention receptacle 230.

Figure 9:
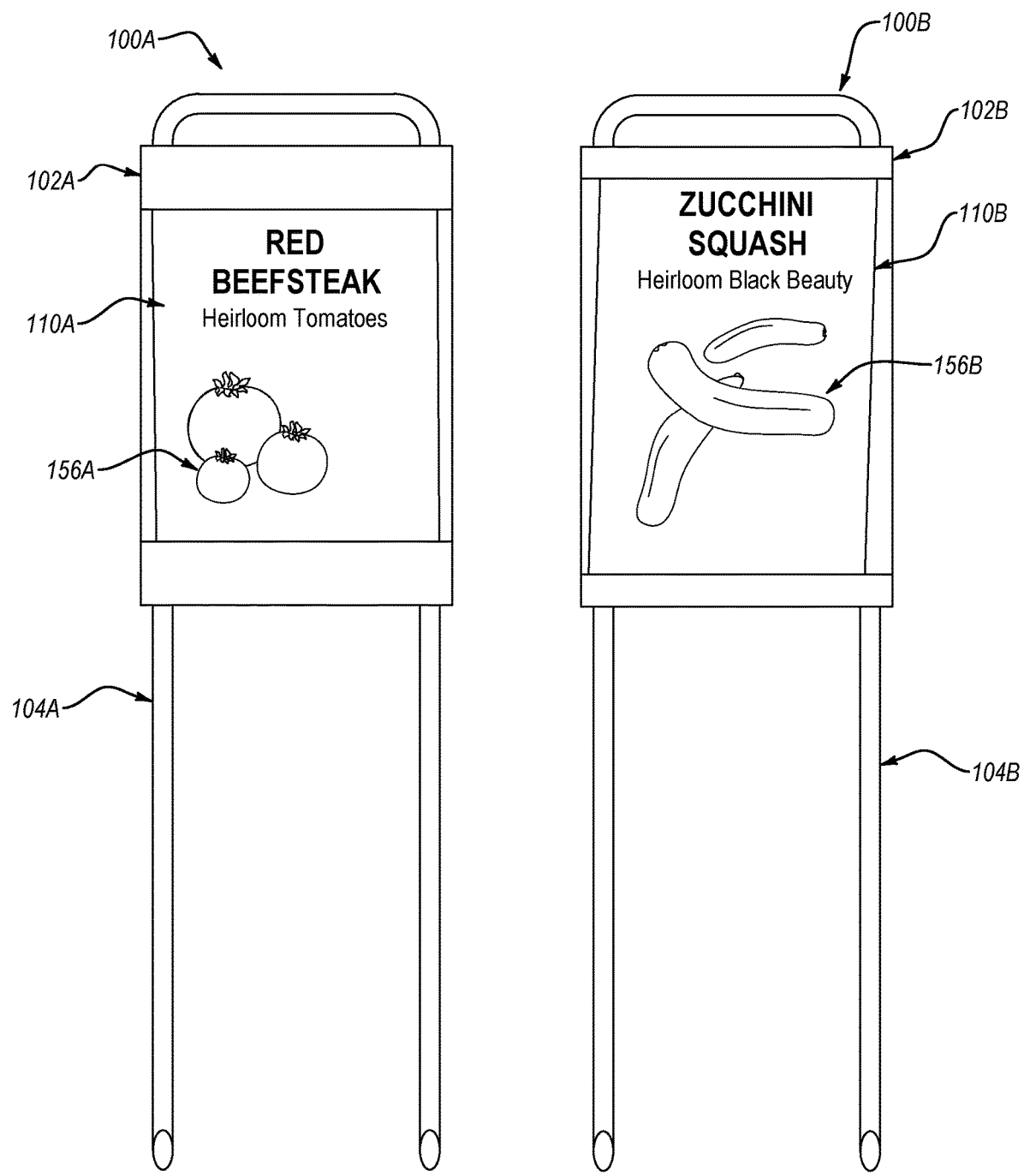
FIG. 9 is a schematic, perspective view of two plant identification signs inside respective plant identification holders, according to one or more examples of the subject disclosure.

As shown in FIG. 9, in some examples, the plant identification holder of the present disclosure is colored to coordinate with a color of the plant (e.g., color of the fruit, vegetable, flower, leave, etc.) being identified by the plant identification holder. In the illustrated example in FIG. 9, a first plant identification holder 100A, which includes a base portion 102A and an anchor portion 104A, is red to coordinate with the red color of the plant (which is a red tomato plant) as indicated by a plant picture 156A on the plant identification sign 110A. Also shown in FIG. 9, as an example, a second plant identification holder 100B, which includes a base portion 102B and an anchor portion 104B, is green to coordinate with the green color of the plant (which is a green zucchini plant) as indicated by a plant picture 156B on the plant identification sign 110B. The coordinating color of the plant identification holder promotes an aesthetically pleasing look and helps provide an initial indication of the type of plant being identified.

Figure 10:
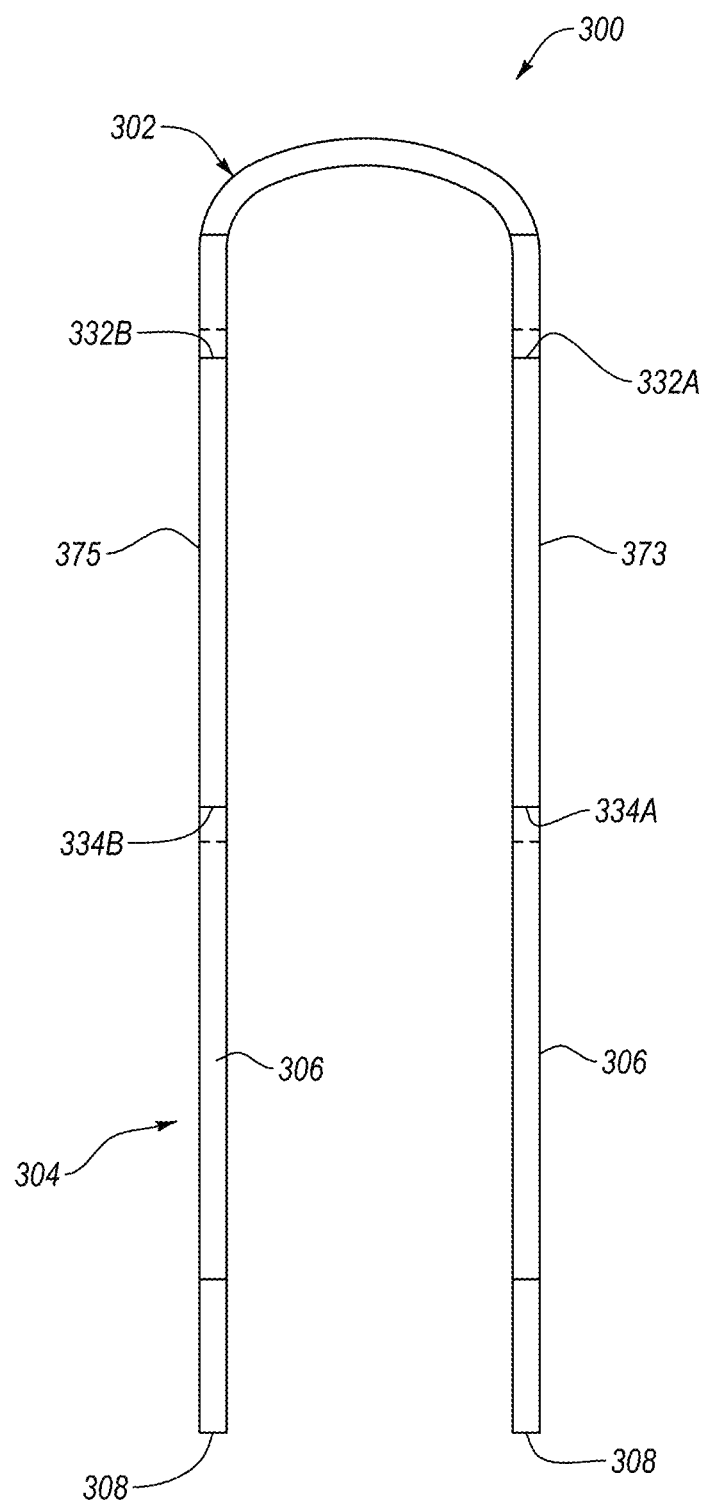
FIG. 10 is a schematic, front view of a plant identification holder, according to one or more examples of the subject disclosure.
Figure 11:
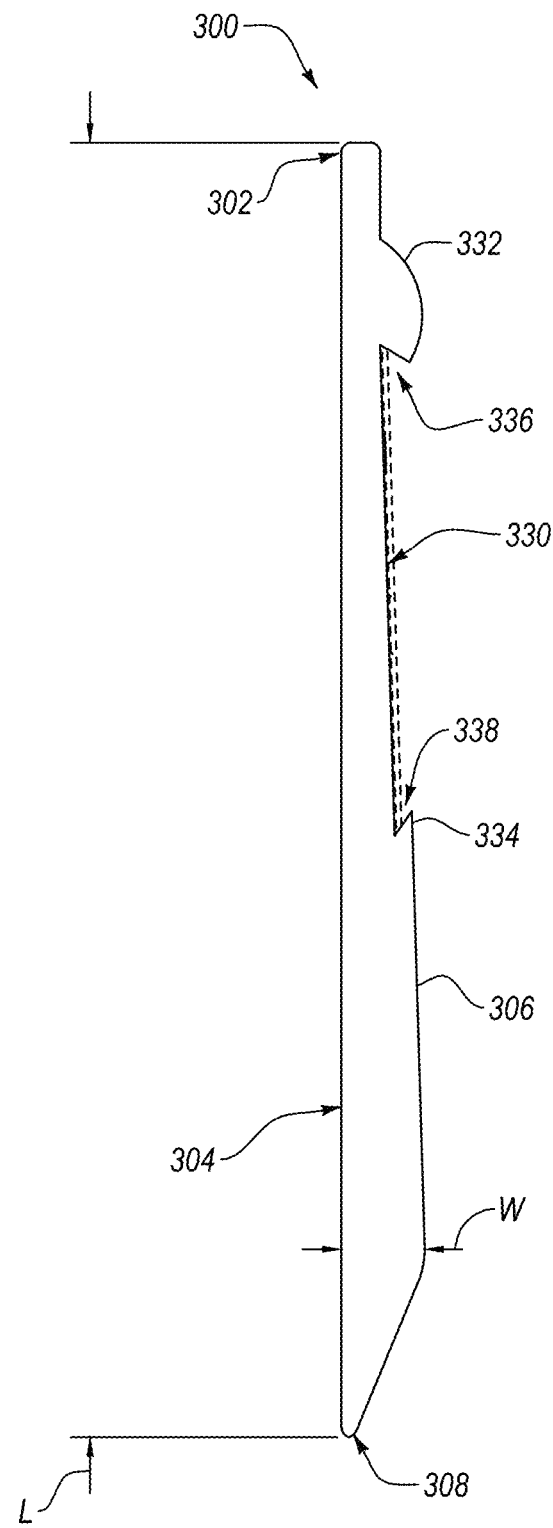
FIG. 11 is a schematic, side view of a plant identification holder, according to one or more examples of the subject disclosure.
Figure 12:
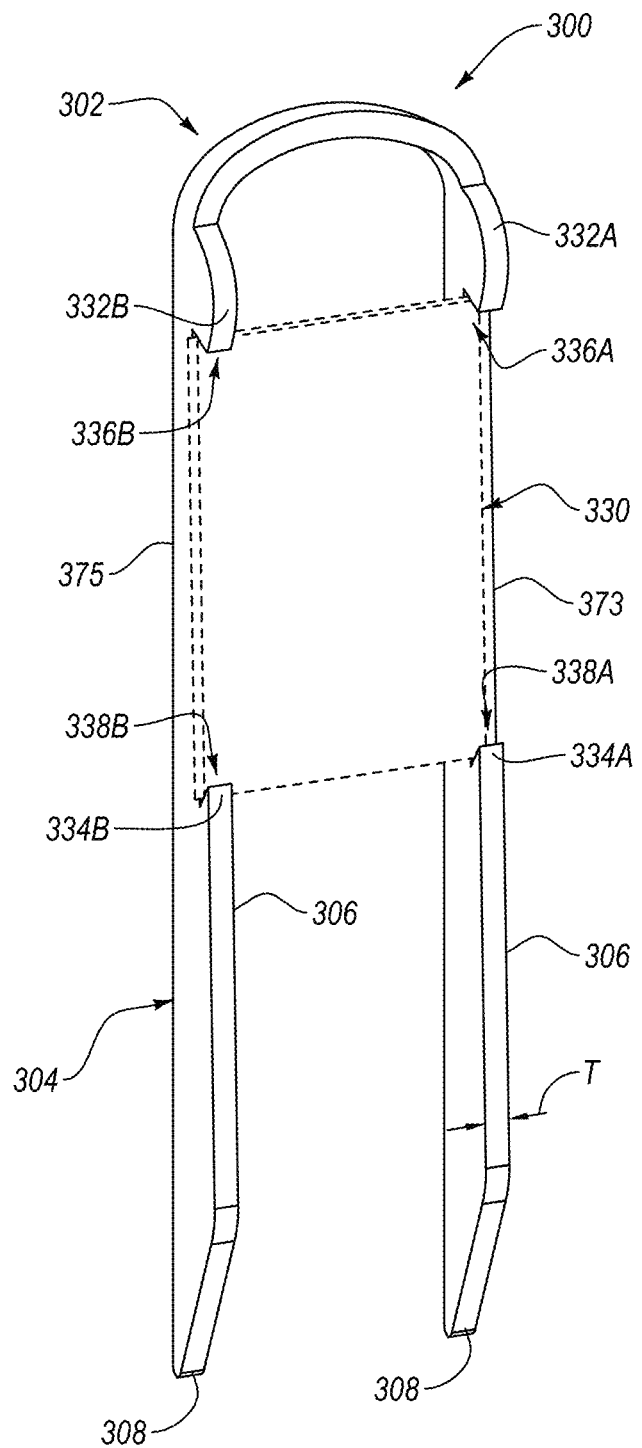
FIG. 12 is a schematic, perspective view of a plant identification holder, according to one or more examples of the subject disclosure.

In other examples, the plant identification holder is configured to retain a plant identification sign 110, without a back plate. Referring to FIGS. 10-12, according to one example, a plant identification holder 300 includes a base portion 302 and an anchor portion 304, which has two anchors 306, coupled to and extending from the base portion 302.

The base portion 302 is generally U-shaped. As defined herein a U-shape is a shape with a generally curved portion and two generally spaced-apart and straight portions extending from the curved portion. Alternatively, a U-shape is defined as a quasi-convex shape or by a function with exactly one turning point. The two generally-spaced-apart and straight portions of the base portion 302 are defined by two prongs (e.g., a first prong 373 and a second prong 375) coupled together at a top of the base portion 302 by a generally curved portion. The first prong 373 and the second prong 375 are parallel to each other and co-planar relative to each other, in some examples.

The base portion 302, like the base portion 102 and the base portion 202, includes tabs that help retain a plant identification stake, such as the plant identification stake 150. According to some examples, analogous to the base portion 102, the base portion 302 includes a pair of top tabs (e.g., a first top tab 332A and a second top tab 332B) and a pair of bottom tabs (e.g., a first bottom tab 334A and second bottom tab 334B). Each one of the tabs is formed in a corresponding one of the prongs and protrudes outwardly from the corresponding one of the prongs. For example, the first top tab 332A is formed in the first prong 373 and protrudes outwardly from the first prong 373 towards the bottom tab 334A. Likewise, the first bottom tab 334A is formed in the first prong 373 and protrudes outwardly from the first prong 373 towards the first top tab 332A. The second top tab 332B is formed in the second prong 375 and protrudes outwardly from the second prong 375 towards the second bottom tab 334B. Similarly, the second bottom tab 334B is formed in the second prong 375 and protrudes outwardly from the second prong 375 towards the second top tab 332B.

Each one of the two anchors 306 of the anchor portion 304 extends from a corresponding one of the first prong 373 and the second prong 375. The first prong 373 can be co-planar with anchor 306 extending therefrom and the second prong 375 can be co-planar with the anchor 306 extending therefrom. Moreover, the first bottom tab 334A is located between the first top tab 332A and a first one of the anchors 306. Likewise, the second bottom tab 334B is located between the second top tab 332B and a second one of the anchors 306. The first top tab 332A, the second top tab 332B, the first bottom tab 334A, and the second bottom tab 334B collectively define a portion of a sign-retention receptacle 330 of the base portion 302 (see, e.g., FIGS. 11-12).

Referring to FIGS. 11 and 12, the first top tab 332A and the second top tab 332B extend from a top portion of the base portion 302, outwardly and downwardly toward the first bottom tab 334A and the second bottom tab 334B, respectively, to define respective top slots 336 in the first prong 373 and the second prong 375. For example, the first top tab 332A defines a first top slot 336A and the second top tab 332B defines a second top slot 336B. The first top slot 336A extends horizontally across the first prong 373 of the sign-retention receptacle 330. The second top slot 336B extends horizontally across the second prong 375. The first top slot 336A and second top slot 336B are vertically aligned.

Referring to FIGS. 11 and 12, the first bottom tab 334A and the second bottom tab 334B extend from an intermediate or bottom portion of the base portion 302, outwardly and upwardly toward the first top tab 332A and the second top tab 332B, respectively, to define respective bottom slots 338 in the first prong 373 and the second prong 375. For example, the first bottom tab 334A defines a first bottom slot 338A and the second bottom tab 334B defines a second bottom slot 338B. The first bottom slot 338A extends horizontally across the first prong 373. The second bottom slot 338B extends horizontally across the second prong 375. The first bottom slot 338A and second bottom slot 338B are vertically aligned. The first top slot 336A and the second top slot 336B define part of a top portion of the sign-retention receptacle 330 and the first bottom slot 338A and second bottom slot 338B define part of a bottom portion of the sign-retention receptacle 330.

The plant identification holder 300 has a length L. Moreover, the plant identification holder 300 has a width, defined as the width W of each one of the prong 373, and corresponding anchor 306, and the prong 375, and corresponding anchor 306. The width W is perpendicular to the length L. Also, the plant identification holder 300 has a thickness, defined as the thickness T of each one of the prong 373, and corresponding anchor 306, and the prong 375, and corresponding anchor 306. The thickness T is perpendicular to both the length L and the width W. In some examples, the width W is less than the length L and the thickness T is less than the width W. The slots of the plant identification holder 300 are parallel to the thickness T. The tabs of the plant identification holder 300 extend outwardly away from the corresponding one of the prongs in a direction parallel to the width W of the prong.

The anchors 306 extend downwardly from the bottom portion of respective ones of the first prong 373 and second prong 375, away from the sign-retention receptacle 330. In some examples, each one of the anchors 306 has a length equal to or greater than the length of each one of the first prong 373 and second prong 375. However, in other examples, each one of the anchors 306 has a length less than the length of each one of the first prong 373 and second prong 375. To help facilitate penetration of each one of the anchors 306 into the ground, the anchors 306 have a pointed end portion 308 in some examples. The pointed end portion 308 can be or include any of various elongated structures that promote penetration into and anchoring to the ground.

The anchors 306 are made from a material that is more rigid than the material of the plant identification sign 110. In one example, the anchors 306 are made of a metallic material, such as steel, aluminum, or a hardened plastic. According to the illustrated example, the overall shape of the base portion 302 and anchors 306 is a U-shape. The anchors 306 are co-formed with the base portion 302, in some examples, such that the anchors 306 and the base portion 302 form a one-piece monolithic and seamless construction formed by a stamping, casting, and/or bending processes.

Figure 13:
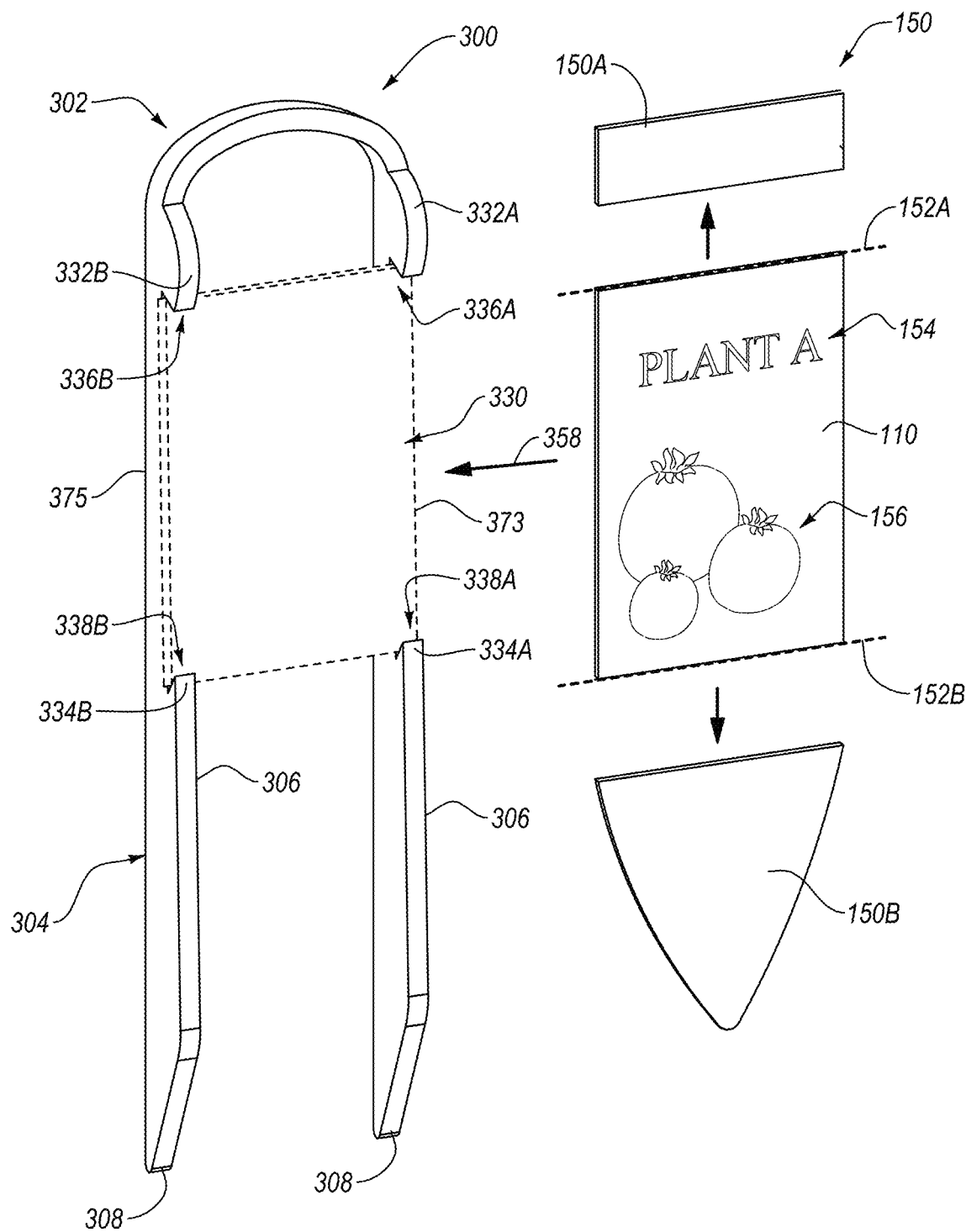
FIG. 13 is a schematic, perspective flow diagram representing a method of inserting a plant identification sign into a plant identification holder, according to one or more examples of the subject disclosure.
Figure 14:
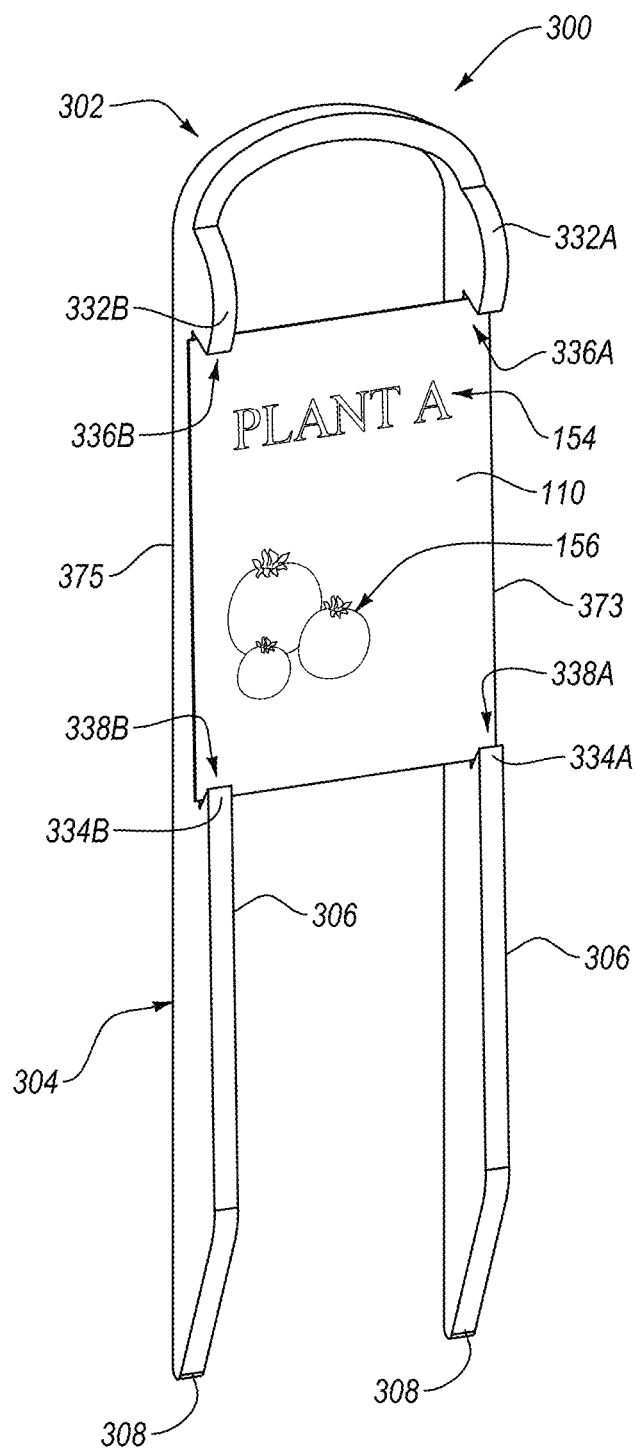
FIG. 14 is a schematic, perspective view of a plant identification sign inside a plant identification holder, according to one or more examples of the subject disclosure.

Referring to FIGS. 13 and 14, the sign-retention receptacle 330 is configured to slidably receive and retain the plant identification sign 110. The plant identification sign 110 is sized to slide into the sign-retention receptacle 330 by first sliding the plant identification sign 110 into and along the first top slot 336A and the first bottom slot 338A and then into and along the second top slot 336B and the second bottom slot 338B, in a first direction 358, as shown in FIG. 13. The first direction 358 is parallel to horizontal in some examples. However, the plant identification sign 110 can be slidably inserted into the sign-retention receptacle 330 by first sliding the plant identification sign 110 into and along the second top slot 336B and the second bottom slot 338B, in a direction opposite the first direction 358, and then into and along the first top slot 336A and the first bottom slot 338A in the same direction. Accordingly, the first top slot 336A and second top slot 336B and the first bottom slot 338A and second bottom slot 338B retain a corresponding top portion and a bottom portion of the plant identification sign 110. Retention of the top portion and the bottom portion of the plant identification sign 110 in the first top slot 336A and second top slot 336B and the first bottom slot 338A and second bottom slot 338B, respectively, helps retain the entire plant identification sign 110 in the sign-retention receptacle 330.

In some examples, the plant identification sign 110 if flexible enough that the plant identification sign 110 can be flexed and positioned within the sign-retention receptacle 330, then unflexed to move into and be retained by the first top slot 336A, the second top slot 336B, the first bottom slot 338A, and the second bottom slot 338B. Accordingly, as defined herein, slidable reception of the plant identification sign 110 into the sign-retention receptacle 330 can be accomplished in at least a couple ways.

Figure 15:
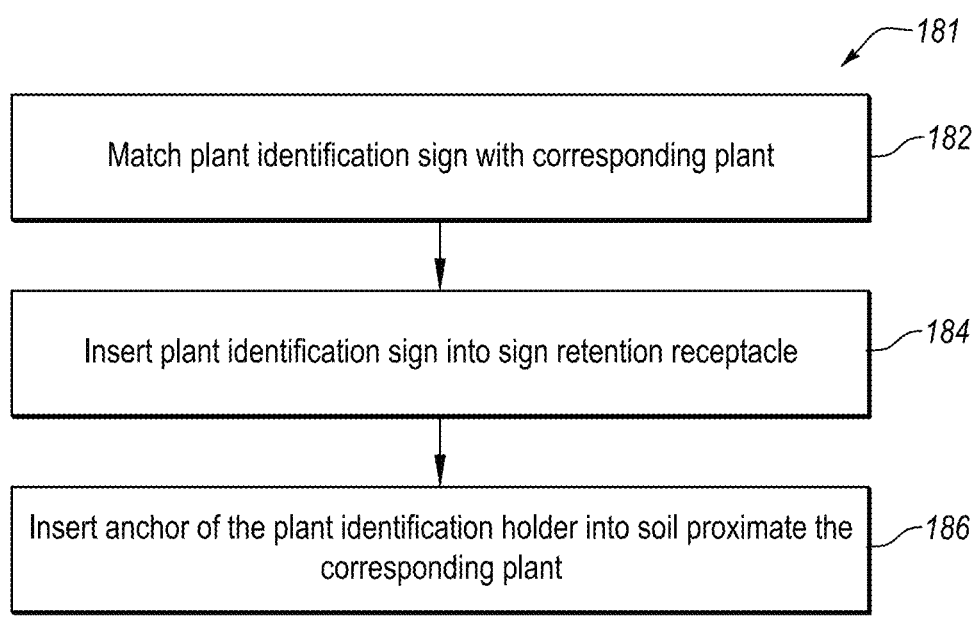
FIG. 15 is a schematic flow diagram of a method of identifying plants, according to one or more examples of the subject disclosure.

Additionally, disclosed herein is a method of identifying a plant. Referring to FIG. 15, according to some examples, a method 181 of identifying a plant includes (block 182) matching a plant identification sign 110 with a corresponding plant, (block 184) inserting the plant identification sign 110 into a sign-retention receptacle of a plant identification holder, and (block 186) inserting at least one anchor of the plant identification holder into soil proximate the corresponding plant. In certain examples, the method 181 also includes trimming the plant identification sign 110 to fit the sign-retention receptacle prior to inserting the plant identification sign 110 into the sign-retention receptacle of the plant identification holder. In one example, inserting the plant identification sign 110 into the sign-retention receptacle comprises sliding the plant identification sign 110 into the sign-retention receptacle from an open side of the sign-retention receptacle such that the plant identification sign rests inside at least one top slot and at least one bottom slot of the plant identification holder.

Figure 16:
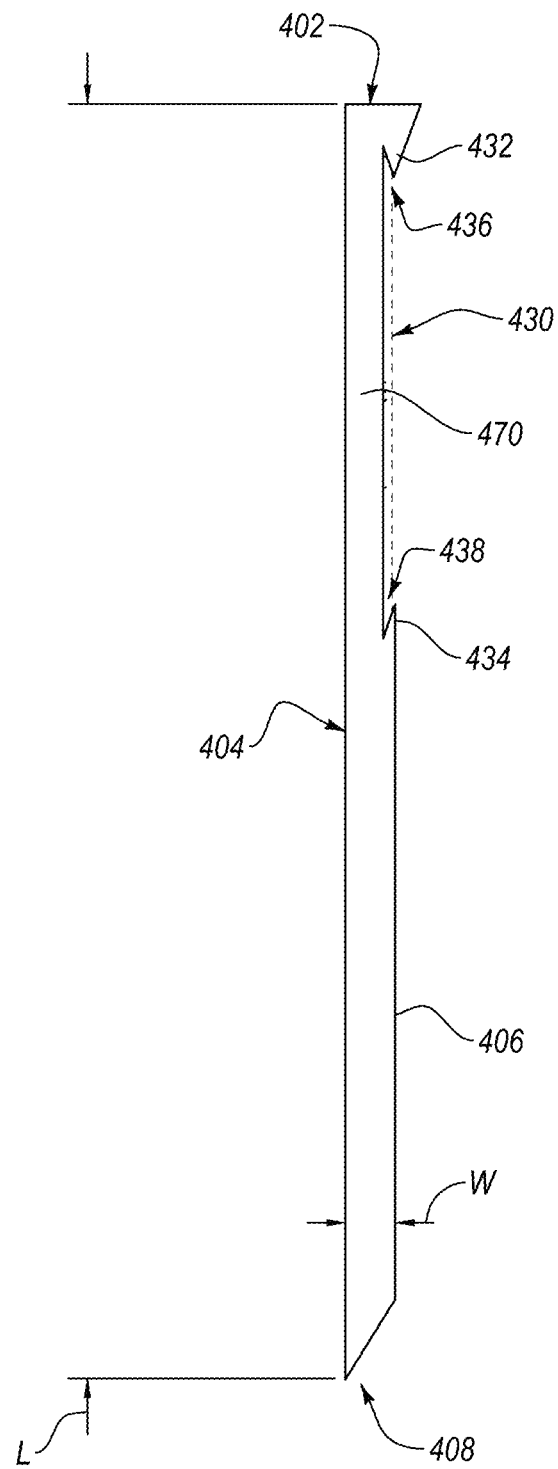
FIG. 16 is a schematic, side view of a plant identification holder, according to one or more examples of the subject disclosure.
Figure 17:
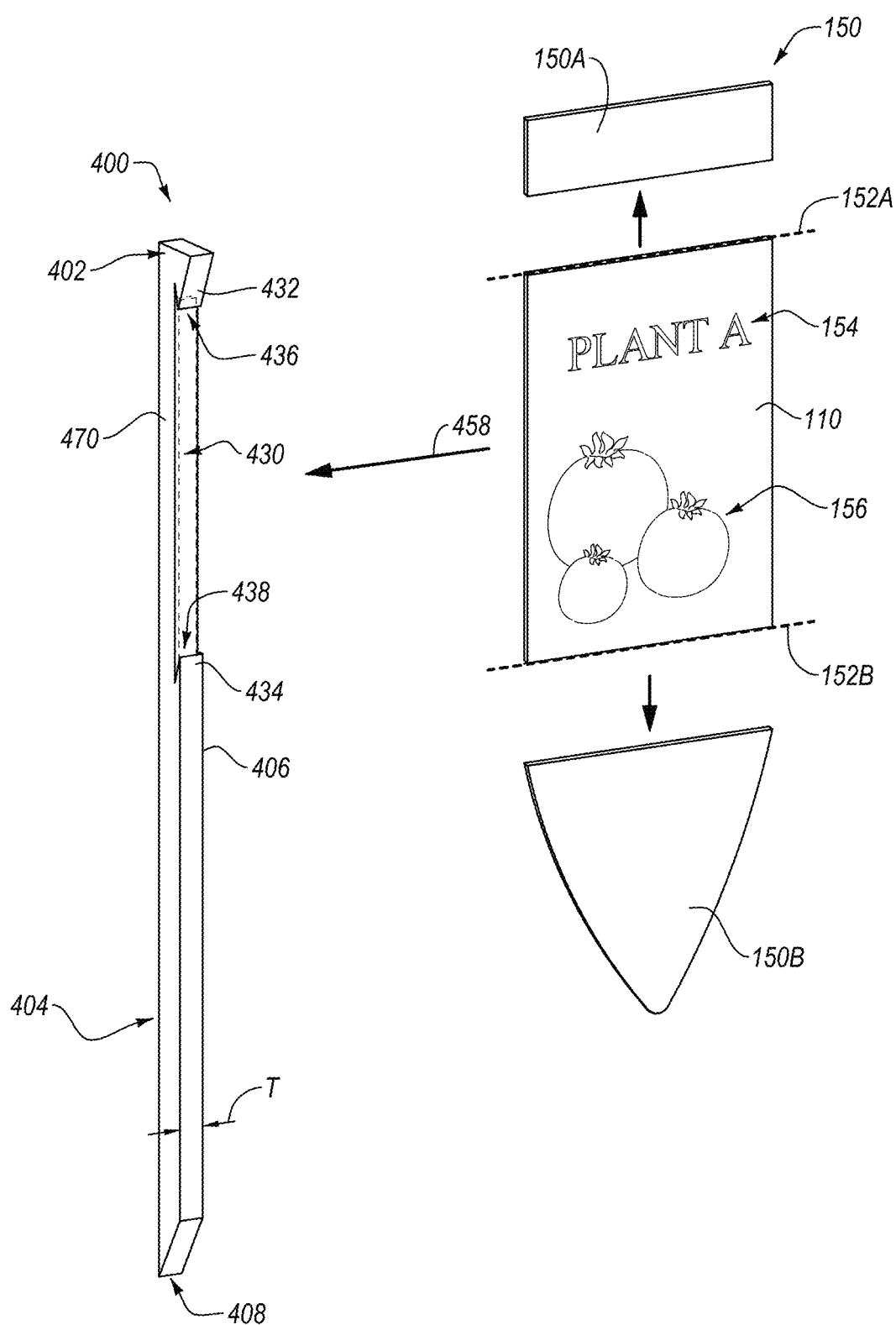
FIG. 17 is a schematic, perspective flow diagram representing a method of inserting a plant identification sign into a plant identification holder, according to one or more examples of the subject disclosure.
Figure 18:
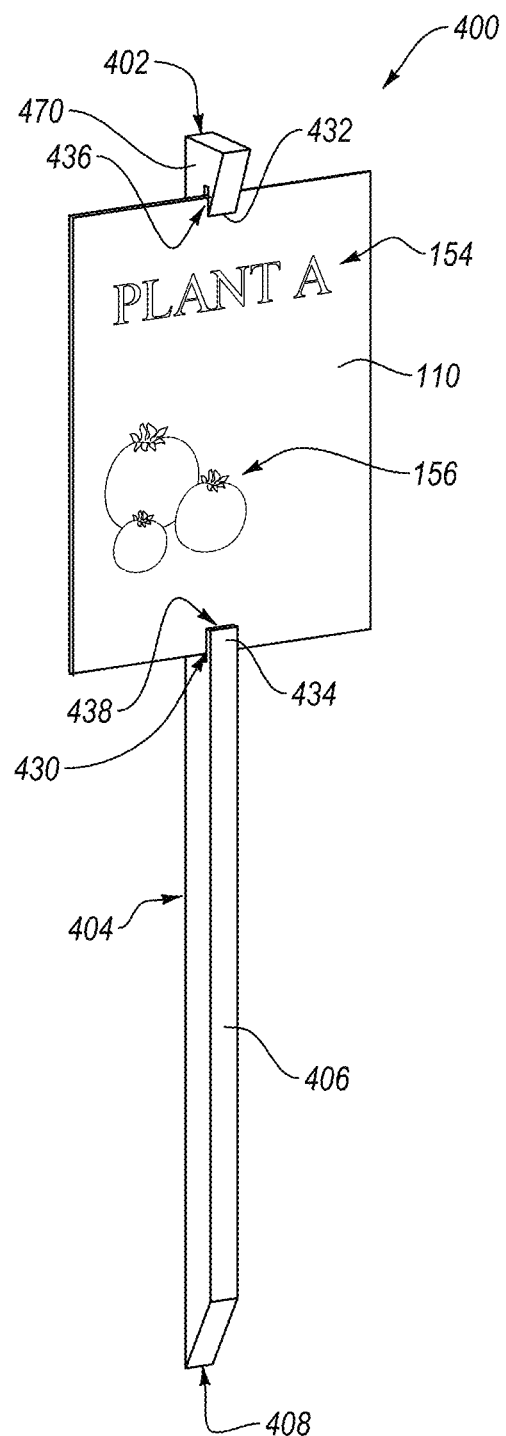
FIG. 18 is a schematic, perspective view of a plant identification sign inside a plant identification holder, according to one or more examples of the subject disclosure.

Referring to FIGS. 16-18, a plant identification holder 400, according to another example, is shown. The plant identification holder 400 is similar to the plant identification holder 300, as shown in FIGS. 10-14, except that the base portion 402 has a single prong and the identification holder 400 has a single anchor extending from the single prong of the base portion 402. More specifically, the plant identification holder 400 includes a base portion 402 and an anchor portion 404 that has a single anchor 406 coupled to the base portion 402. The base portion 402 and the anchor portion 404 are co-planar in some examples. The anchor portion 404 also includes a pointed end portion 408. The anchor 406 is co-formed with the base portion 402 such that the anchor 406 and the base portion 402 form a one-piece monolithic and seamless construction. Moreover, the base portion 402 includes a single prong 470, which includes a top tab 432 and bottom tab 434 formed in and protruding outwardly from the prong 470. The top tab 432 protrudes outwardly and downwardly towards the bottom tab 434. The bottom tab 434 protrudes outwardly and upwardly towards the top tab 432. The bottom tab 434 is located between the top tab 432 and the anchor 406. The top tab 432 and the bottom tab 434 define a sign-retention receptacle 430 of the base portion 402.

The base portion 402, like the base portion 102 of the plant identification holder 100, also includes slots that form part of the sign-retention receptacle 430 and that help retain the plant identification sign 110. However, the base portion 402 includes and the sign-retention receptacle 430 is defined by only a single upper slot and a single lower slot. Notwithstanding being defined by a single top slot 436 and a single bottom slot 438, the sign-retention receptacle 430 is configured to slidably receive and retain the plant identification sign 110. The plant identification sign 110 is sized to slide into the top slot 436 and the bottom slot 438 in a first direction 458 through an open side of the sign-retention receptacle 330, as shown in FIG. 17. The first direction 458 is parallel to horizontal (e.g., parallel to the top slot 436 and the bottom slot 438) in some examples. Accordingly, the top slot 436 and the bottom slot 438 retain a corresponding top portion and a bottom portion of the plant identification sign 110. Retention of the top portion and the bottom portion of the plant identification sign 110 in the first top slot 436 and the bottom slot 438 helps retain the entire plant identification sign 110 in the sign-retention receptacle 430.

The plant identification holder 400 has a length L. Moreover, the plant identification holder 400 has a width, defined as the width W of the prong 470, and corresponding anchor 406. The width W is perpendicular to the length L. Also, the plant identification holder 400 has a thickness, defined as the thickness T of the prong 470, and corresponding anchor 406. The thickness T is perpendicular to both the length L and the width W. In some examples, the width W is less than the length L and the thickness T is less than the width W. The slots of the plant identification holder 400 are parallel to the thickness T. The tabs of the plant identification holder 400 extend outwardly away from the prong in a direction parallel to the width W of the prong.

Figure 19:
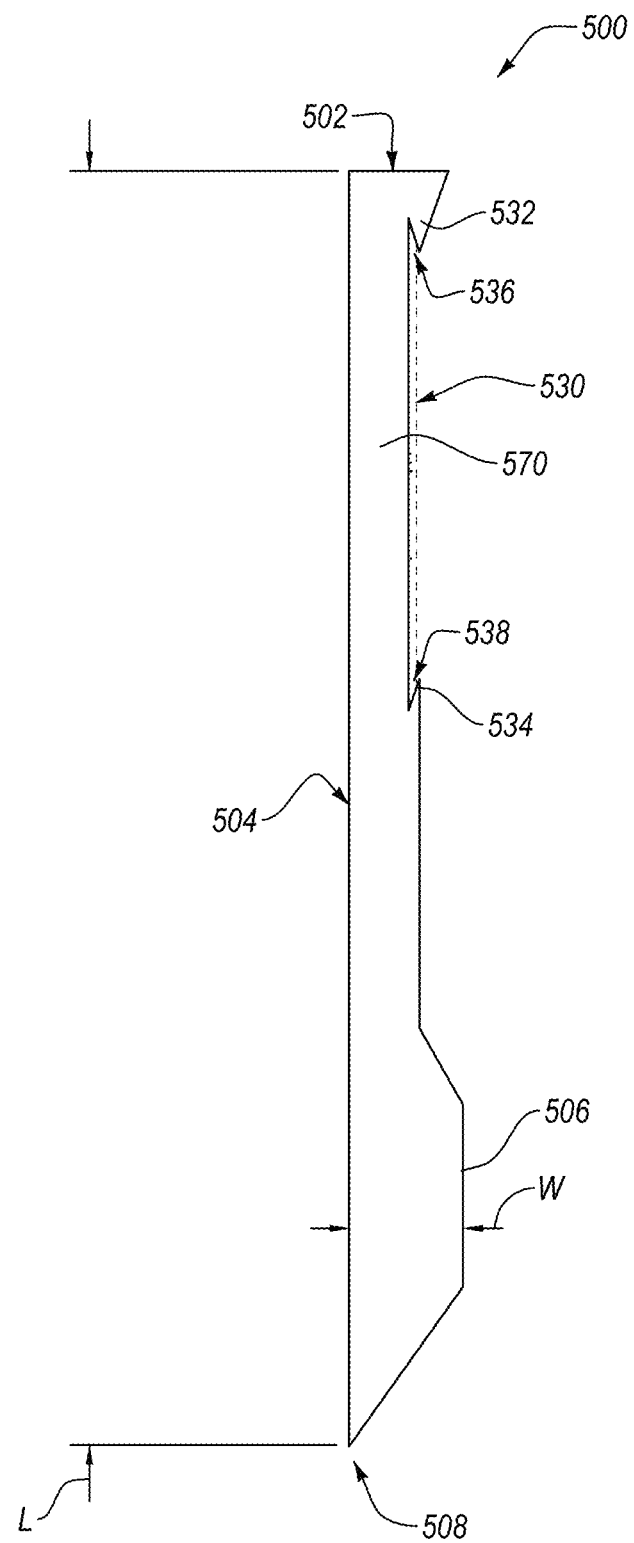
FIG. 19 is a schematic, side view of a plant identification holder, according to one or more examples of the subject disclosure.
Figure 20:
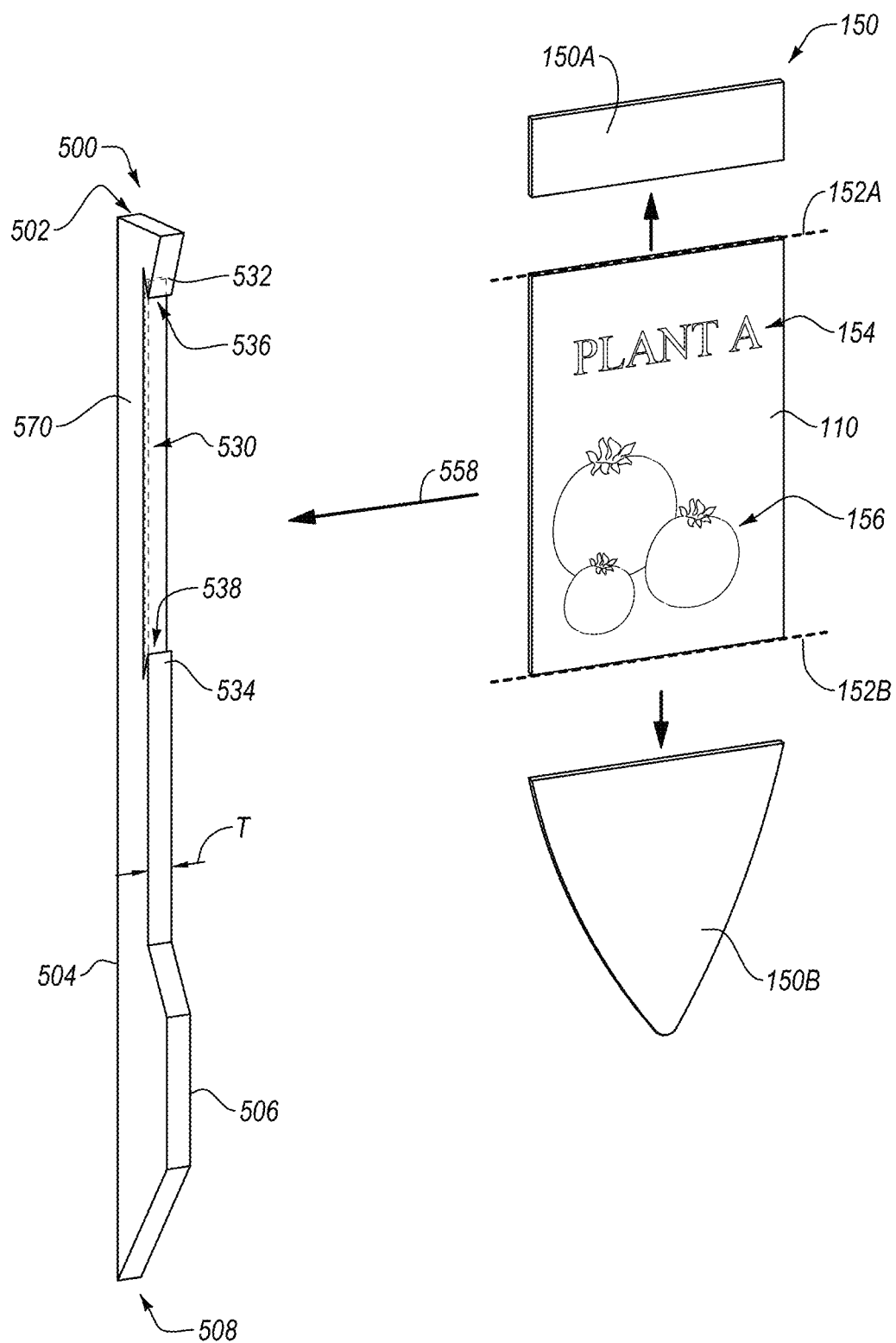
FIG. 20 is a schematic, perspective flow diagram representing a method of inserting a plant identification sign into a plant identification holder, according to one or more examples of the subject disclosure.
Figure 21:
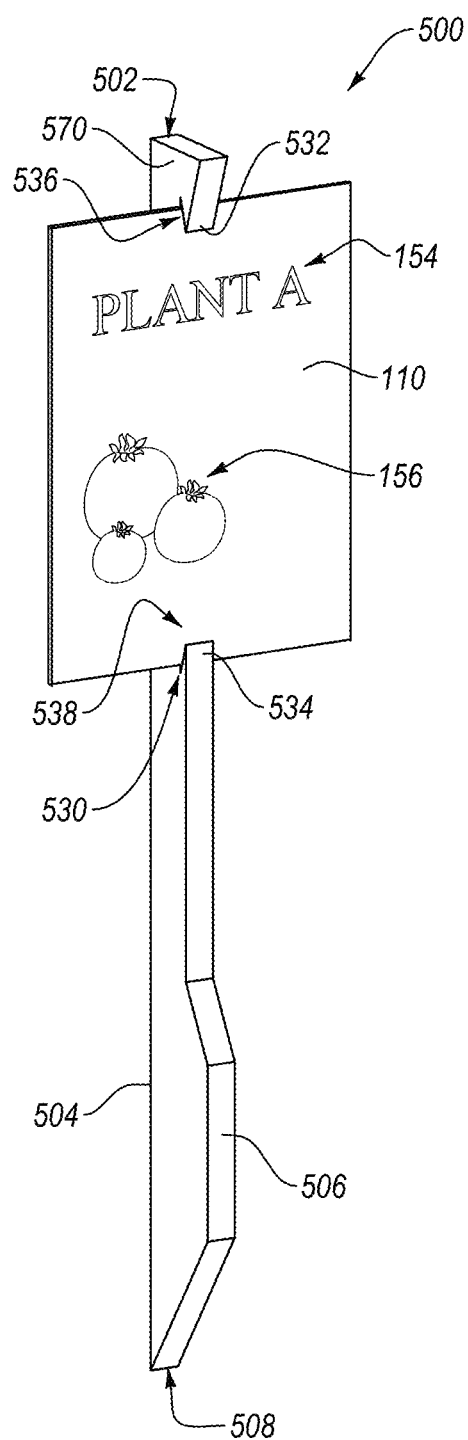
FIG. 21 is a schematic, perspective view a plant identification sign inside a plant identification holder, according to one or more examples of the subject disclosure.

Referring to FIGS. 19-21, in other examples, a plant identification holder 500, similar to the plant identification holder 400, includes a base portion 502, with a single prong 570, and an anchor portion 504 with a single anchor 506 extending from the prong 570. The anchor 506 is co-formed with the base portion 502 such that the anchor 506 and the base portion 502 form a one-piece monolithic and seamless construction. The base portion 502 and the anchor portion 504 are co-planar in some examples. The anchor portion 504 includes a pointed end portion 508 extending from the anchor 506. The base portion 502 includes a single prong 570, which includes a top tab 532 and bottom tab 534 formed in and protruding outwardly from the prong 570. The top tab 532 protrudes outwardly and downwardly towards the bottom tab 534. The bottom tab 534 protrudes outwardly and upwardly towards the top tab 532. The bottom tab 534 is located between the top tab 532 and the anchor 506. The top tab 532 and the bottom tab 534 define a sign-retention receptacle 530 of the base portion 502. Unlike the plant identification holder 400, the anchor 506 is wider, across a width W of the plant identification holder 500, than the base portion 502. The extended or greater width of the anchor 506 helps to help facilitate anchoring of the plant identification holder in the ground. The anchor 506 is interposed between the bottom tab 534 and the pointed end portion 508.

The plant identification holder 500 has a length L. Moreover, the plant identification holder 500 has a width, defined as the width W of the prong 570, and corresponding anchor 506. The width W is perpendicular to the length L. Also, the plant identification holder 500 has a thickness, defined as the thickness T of the prong 570, and corresponding anchor 506. The thickness T is perpendicular to both the length L and the width W. In some examples, the width W is less than the length L and the thickness T is less than the width W. The slots of the plant identification holder 500 are parallel to the thickness T. The tabs of the plant identification holder 500 extend outwardly away from the prong in a direction parallel to the width W of the prong. The width W of the anchor 506 can be greater than the width of the prong 570 in some examples. Moreover, the anchor 506 can have a toothed or notched portion to help keep the anchor 506 in the ground by resisting pull-out forces.

The plant identification holders of the present disclosure are configured to be reusable for the same or different plants during the same or over different seasons. For example, a plant identification sign or plant identification stake can be selectively removed from a plant identification holder and replaced with another plant identification sign or plant identification stake.

In view of the foregoing, in some examples, the plant identification holders are more rigid, stronger, and more durable than the plant identification sign 110 and the corresponding plant identification stake 150, as described above. Moreover, the plant identification holders provides better anchoring in the ground than the plant identification stake 150. Accordingly, the plant identification holders help increase the longevity and usability of plant identification stakes and provide an organized, reliable, and aesthetically pleasing method of identifying plants.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. Examples of the scope of the present subject matter can be found in the following numbered paragraphs.

The invention claimed is:

1. A plant identification holder, comprising:
  a base portion, comprising:
    a sign-retention receptacle configured to selectively retain a plant identification sign;
    a U-shaped portion comprising two spaced-apart prongs; and
    two top tabs, each formed in a corresponding one of the two spaced-apart prongs, and two bottom tabs, each formed in a corresponding one of the two spaced-apart prongs; and
  an anchor portion, comprising, two anchors coupled to and extending from the base portion;
  wherein:
    a first length is defined by a length from a top end of the base portion to an end portion of one of the two anchors;
    a second length is defined by a length from one of the two top tabs to the end portion of a corresponding one of the two anchors;
    the first length is greater than the second length;
    the sign-retention receptacle is defined by and between the two top tabs and the two bottom tabs;
    the two top tabs define a top slot and the two bottom tabs define a bottom slot;
    the top slot and the bottom slot are configured to retain and secure corresponding portions of the plant identification sign;
    the two top tabs extends downwardly toward the two bottom tabs;
    the two bottom tabs extends upwardly toward the two top tabs;
    the spaced-apart prongs and the two anchors are elongated along a length of the plant identification holder;
    each one of the two top tabs and the two bottom tabs extends outwardly away from the corresponding one of the two spaced-apart prongs in a direction parallel to a width of the plant identification holder;
    the width of the plant identification holder is perpendicular to the length of the plant identification holder;
    the width of the plant identification holder is less than the length of the plant identification holder;
    a thickness of the plant identification holder is perpendicular to the length and the width of the plant identification holder;
    the thickness of the plant identification holder is less than the width of the plant identification holder; and
    the width of each one of the two anchors is greater than the width of each one of the two spaced-apart prongs of the base portion.

2. The plant identification holder of claim 1, wherein:
  the top slot is defined between the two top tabs and the prongs; and the bottom slot is defined between the two bottom tabs and the prongs.

3. The plant identification holder of claim 1, wherein each one of the top slot and the bottom slot extends in a direction parallel to a thickness of the plant identification holder.

4. The plant identification holder of claim 3, wherein the sign-retention receptacle comprises first and second open ends, which are opposite each other, and an open front side.

5. The plant identification holder of claim 1, wherein the base portion and the anchor portion are co-planar.

6. The plant identification holder of claim 1, wherein the base portion and the anchor portion form a one-piece monolithic and seamless construction.

7. The plant identification holder of claim 6, wherein the base portion and the anchor portion are made of a metallic material.

8. The plant identification holder of claim 1, wherein the anchor comprises a pointed end portion.

9. The plant identification holder of claim 1, wherein the sign-retention receptacle is configured to slidably receive and retain the plant identification sign.

10. The plant identification holder of claim 1, wherein the width is constant at the U-shaped portion of the plant identification holder.

11. A plant identification holder, comprising:
a base portion, comprising:
   a sign-retention receptacle configured to selectively retain a plant identification sign;
   a U-shaped portion comprising two spaced-apart prongs; and
   two top tabs, each formed in a corresponding one of the two spaced-apart prongs, and two bottom tabs, each formed in a corresponding one of the two spaced-apart prongs; and
an anchor portion, comprising, two anchors coupled to and extending from the base portion;
wherein:
   a first length is defined by a length from a top end of the base portion to an end portion of one of the two anchors;
   a second length is defined by a length from one of the two top tabs to the end portion of a corresponding one of the two anchors;
   the first length is greater than the second length; and
   the width of the two prongs and two anchors increases in a direction away from the U-shaped portion.

12. A plant identification holder, comprising:
a base portion, comprising:
   a sign-retention receptacle configured to selectively retain a plant identification sign;
   a U-shaped portion comprising two spaced-apart prongs; and
   two top tabs, each formed in a corresponding one of the two spaced-apart prongs, and two bottom tabs, each formed in a corresponding one of the two spaced-apart prongs; and
an anchor portion, comprising, two anchors coupled to and extending from the base portion;
wherein:
   a first length is defined by a length from a top end of the base portion to an end portion of one of the two anchors;
   a second length is defined by a length from one of the two top tabs to the end portion of a corresponding one of the two anchors;
   the first length is greater than the second length; and
   the width of each one of the two anchors is greater than the width of each one of the two prongs of the base portion.

* * * * *